US011648723B2

(12) United States Patent
Wilson et al.

(10) Patent No.: US 11,648,723 B2
(45) Date of Patent: May 16, 2023

(54) METHOD AND APPARATUS FOR REDUCING NON-NORMAL INCIDENCE DISTORTION IN GLAZING FILMS

(71) Applicant: Racing Optics, Inc., Las Vegas, NV (US)

(72) Inventors: Bart E. Wilson, Las Vegas, NV (US); Stephen S. Wilson, Las Vegas, NV (US)

(73) Assignee: Racing Optics, Inc., Las Vegas, NV (US)

( * ) Notice: Subject to any disclaimer, the term of this patent is extended or adjusted under 35 U.S.C. 154(b) by 246 days.

(21) Appl. No.: 17/103,397

(22) Filed: Nov. 24, 2020

(65) Prior Publication Data

US 2021/0162645 A1    Jun. 3, 2021

Related U.S. Application Data

(60) Provisional application No. 62/942,943, filed on Dec. 3, 2019.

(51) Int. Cl.
| | |
|---|---|
| *B29C 48/92* | (2019.01) |
| *G01M 11/02* | (2006.01) |
| *B29C 48/00* | (2019.01) |
| *B29C 48/08* | (2019.01) |
| *B29C 48/35* | (2019.01) |

(Continued)

(52) U.S. Cl.
CPC .......... *B29C 48/92* (2019.02); *B29C 48/0018* (2019.02); *B29C 48/08* (2019.02); *B29C 48/35* (2019.02); *B29C 48/395* (2019.02); *B29C 48/87* (2019.02); *G01M 11/0292* (2013.01); *B29C 2948/9259* (2019.02); *B29C 2948/92704* (2019.02); *B29K 2067/003* (2013.01); *B29K 2995/0053* (2013.01)

(58) Field of Classification Search
None
See application file for complete search history.

(56) References Cited

U.S. PATENT DOCUMENTS

| | | | |
|---|---|---|---|
| 1,337,036 | A | 4/1920 | Frederic |
| 1,366,907 | A | 2/1921 | Dunand |

(Continued)

FOREIGN PATENT DOCUMENTS

| | | |
|---|---|---|
| AU | 2005244595 A1 | 7/2006 |
| AU | 2015277196 A1 | 1/2017 |

(Continued)

OTHER PUBLICATIONS

PCT International Application No. PCT/US99/25128 with International Search Report, Date of Completion Jan. 18, 2000, 54 Pages.

(Continued)

*Primary Examiner* — Robert J Grun
(74) *Attorney, Agent, or Firm* — Stetina Brunda Garred and Brucker (57) ABSTRACT

A method of manufacturing a polymer film includes melting a resin, extruding the melted resin through a die to produce a polymer film, shaping the polymer film, cooling the polymer film, capturing an image of a test pattern through the polymer film, calculating a modulation transfer function value from the image, and adjusting a process parameter of the melting, the extruding, the shaping, or the cooling based on the calculated modulation transfer function value.

18 Claims, 5 Drawing Sheets

(51) Int. Cl.
  *B29C 48/395* (2019.01)
  *B29C 48/87* (2019.01)
  *B29K 67/00* (2006.01)

(56) References Cited

U.S. PATENT DOCUMENTS

| | | |
|---|---|---|
| 2,138,086 A | 11/1938 | Blodjer |
| 2,248,331 A | 7/1941 | Blodjer |
| 2,328,687 A | 9/1943 | Serr |
| 2,339,280 A | 1/1944 | Madson |
| 2,354,415 A | 7/1944 | Woodard |
| 2,461,604 A | 2/1949 | Huntsman |
| 2,511,329 A | 6/1950 | Craig |
| 2,546,117 A | 3/1951 | Whelan |
| 2,563,125 A | 8/1951 | Malcom, Jr. |
| 2,569,715 A | 10/1951 | Green |
| 2,640,068 A | 5/1953 | Schaefer et al. |
| 2,736,109 A | 2/1956 | Scholl |
| 2,923,944 A | 2/1960 | Lindblom |
| 2,963,708 A | 12/1960 | Herbine et al. |
| 3,095,575 A | 7/1963 | Radov |
| 3,298,031 A | 1/1967 | Harold |
| 3,475,766 A | 11/1969 | Raschke |
| 3,577,565 A | 5/1971 | Feldmann et al. |
| 3,605,115 A | 9/1971 | Bohner |
| 3,685,054 A | 8/1972 | Raschke |
| 3,774,239 A | 11/1973 | Kotzar |
| 3,785,102 A | 1/1974 | Amos |
| 3,797,042 A | 3/1974 | Gager |
| 3,810,815 A | 5/1974 | Welhart et al. |
| 3,868,293 A | 2/1975 | Selph |
| 3,937,863 A | 2/1976 | Moore |
| 3,948,662 A | 4/1976 | Alston et al. |
| 3,950,580 A | 4/1976 | Boudet |
| 3,987,569 A | 10/1976 | Chase |
| 4,063,740 A | 12/1977 | Mader |
| 4,076,373 A | 2/1978 | Moretti |
| 4,090,464 A | 5/1978 | Bishopp et al. |
| D249,597 S | 9/1978 | Dillon |
| 4,138,746 A | 2/1979 | Bergmann |
| D254,638 S | 4/1980 | Bay, Jr. |
| 4,204,231 A | 5/1980 | Permenter |
| 4,248,762 A | 2/1981 | Hornibrook et al. |
| 4,248,918 A | 2/1981 | Hornibrook et al. |
| 4,268,134 A | 5/1981 | Gulati et al. |
| 4,273,098 A | 6/1981 | Silverstein |
| 4,301,193 A | 11/1981 | Zuk |
| 4,332,861 A | 6/1982 | Franz et al. |
| 4,333,983 A | 6/1982 | Allen |
| 4,380,563 A | 4/1983 | Ayotte |
| 4,528,701 A | 7/1985 | Smith |
| 4,557,980 A | 12/1985 | Hodnett, III |
| 4,582,764 A | 4/1986 | Allerd et al. |
| 4,625,341 A | 12/1986 | Broersma |
| 4,658,515 A | 4/1987 | Oatman |
| 4,696,860 A | 9/1987 | Epperson |
| 4,701,965 A | 10/1987 | Landis |
| 4,716,601 A | 1/1988 | McNeal |
| 4,726,074 A | 2/1988 | Baclit et al. |
| 4,729,179 A | 3/1988 | Quist |
| 4,769,265 A | 9/1988 | Coburn, Jr. |
| D299,767 S | 2/1989 | Hsin |
| 4,842,919 A | 6/1989 | David et al. |
| 4,850,049 A | 7/1989 | Landis et al. |
| 4,852,185 A | 8/1989 | Olson |
| 4,852,186 A | 8/1989 | Landis |
| 4,853,974 A | 8/1989 | Olim |
| 4,856,535 A | 8/1989 | Forbes |
| 4,864,653 A | 9/1989 | Landis |
| 4,867,178 A | 9/1989 | Smith |
| 4,884,296 A | 12/1989 | Nix, Jr. |
| 4,884,302 A | 12/1989 | Foehl |
| 4,889,754 A | 12/1989 | Vargas |
| D306,363 S | 2/1990 | Stackhouse et al. |
| 4,907,090 A | 3/1990 | Ananian |
| D307,065 S | 4/1990 | Friedman |
| 4,920,576 A | 5/1990 | Landis |
| 4,934,792 A | 6/1990 | Tovi |
| 4,945,573 A | 8/1990 | Landis |
| 4,950,445 A | 8/1990 | Salce et al. |
| D311,263 S | 10/1990 | Russell |
| 4,964,171 A | 10/1990 | Landis |
| 4,965,887 A | 10/1990 | Paoluccio et al. |
| 4,973,511 A | 11/1990 | Farmer et al. |
| 4,975,981 A | 12/1990 | Ray |
| 5,000,528 A | 3/1991 | Kawakatsu |
| 5,002,326 A | 3/1991 | Westfield et al. |
| D318,147 S | 7/1991 | Russell |
| 5,035,004 A | 7/1991 | Koester |
| D319,449 S | 8/1991 | Millar |
| 5,046,195 A | 9/1991 | Koritan |
| D321,268 S | 10/1991 | Nix, Jr. |
| 5,052,054 A | 10/1991 | Birum |
| 5,067,475 A | 11/1991 | Posnansky |
| 5,071,206 A | 12/1991 | Hood et al. |
| H1023 H | 3/1992 | Wiseman, Sr. |
| 5,104,929 A | 4/1992 | Bilkadi |
| 5,113,528 A | 5/1992 | Burke et al. |
| D331,820 S | 12/1992 | Scanlon |
| D333,366 S | 2/1993 | Brown |
| 5,183,700 A | 2/1993 | Austin |
| 5,194,293 A | 3/1993 | Foster |
| 5,201,077 A | 4/1993 | Dondlinger |
| 5,206,956 A | 5/1993 | Olson |
| 5,208,916 A | 5/1993 | Kelman |
| 5,239,406 A | 8/1993 | Lynam |
| 5,318,685 A | 6/1994 | O'Shaughnessy |
| D349,177 S | 7/1994 | Russell |
| D349,178 S | 7/1994 | Russell |
| D349,362 S | 8/1994 | Russell |
| 5,364,671 A | 11/1994 | Gustafson |
| 5,365,615 A | 11/1994 | Piszkin |
| D353,691 S | 12/1994 | Scanlon |
| D354,588 S | 1/1995 | Russell |
| D354,589 S | 1/1995 | Russell |
| 5,420,649 A | 5/1995 | Lewis |
| D359,586 S | 6/1995 | Lofton |
| D361,160 S | 8/1995 | Russell |
| 5,443,877 A | 8/1995 | Kramer et al. |
| D362,086 S | 9/1995 | Russell |
| 5,471,036 A | 11/1995 | Sperbeck |
| 5,473,778 A | 12/1995 | Bell |
| 5,486,883 A | 1/1996 | Candido |
| 5,510,173 A | 4/1996 | Pass et al. |
| 5,512,116 A | 4/1996 | Campfield |
| 5,523,132 A | 6/1996 | Zhang et al. |
| RE35,318 E | 8/1996 | Warman |
| 5,544,361 A | 8/1996 | Fine et al. |
| 5,553,608 A | 9/1996 | Reese et al. |
| 5,555,570 A | 9/1996 | Bay |
| 5,557,683 A | 9/1996 | Eubanks |
| 5,584,130 A | 12/1996 | Perron |
| 5,592,698 A | 1/1997 | Woods |
| 5,593,786 A | 1/1997 | Parker et al. |
| 5,622,580 A | 4/1997 | Mannheim |
| 5,633,049 A | 5/1997 | Bilkadi et al. |
| 5,668,612 A | 9/1997 | Hung |
| 5,671,483 A | 9/1997 | Reuber |
| 5,673,431 A | 10/1997 | Batty |
| 5,687,420 A | 11/1997 | Chong |
| 5,694,650 A | 12/1997 | Hong |
| 5,709,825 A | 1/1998 | Shih |
| 5,740,560 A | 4/1998 | Muoio |
| 5,792,535 A | 8/1998 | Weder |
| 5,815,848 A | 10/1998 | Jarvis |
| 5,819,311 A | 10/1998 | Lo |
| 5,846,659 A | 12/1998 | Loewer et al. |
| D404,849 S | 1/1999 | Desy |
| 5,885,704 A | 3/1999 | Peiffer et al. |
| 5,896,991 A | 4/1999 | Hippely et al. |
| 5,924,129 A | 7/1999 | Gill |
| 5,937,596 A | 8/1999 | Leeuwenburgh et al. |
| 5,956,175 A | 9/1999 | Hojnowski |
| 5,972,453 A | 10/1999 | Akiwa et al. |

(56) References Cited

U.S. PATENT DOCUMENTS

| | | |
|---|---|---|
| 5,991,072 A | 11/1999 | Solyntjes et al. |
| 5,991,081 A | 11/1999 | Haaland et al. |
| 5,991,930 A | 11/1999 | Sorrentino |
| D418,256 S | 12/1999 | Caruana |
| 6,008,299 A | 12/1999 | Mcgrath et al. |
| 6,049,419 A | 4/2000 | Wheatley et al. |
| 6,085,358 A | 7/2000 | Cogan |
| 6,173,447 B1 | 1/2001 | Arnold |
| 6,217,099 B1 | 4/2001 | McKinney et al. |
| 6,221,112 B1 | 4/2001 | Snider |
| 6,237,147 B1 | 5/2001 | Brockman |
| 6,250,765 B1 | 6/2001 | Murakami |
| 6,305,073 B1 | 10/2001 | Badders |
| 6,347,401 B1 | 2/2002 | Joyce |
| 6,375,865 B1 | 4/2002 | Paulson et al. |
| 6,378,133 B1 | 4/2002 | Daikuzono |
| 6,381,750 B1 | 5/2002 | Mangan |
| 6,385,776 B2 | 5/2002 | Linday |
| 6,388,813 B1 | 5/2002 | Wilson et al. |
| 6,416,872 B1 | 7/2002 | Maschwitz |
| 6,432,522 B1 | 8/2002 | Friedman et al. |
| 6,461,709 B1 | 10/2002 | Janssen et al. |
| 6,469,752 B1 | 10/2002 | Ishikawa et al. |
| 6,403,005 B1 | 11/2002 | Mientus et al. |
| 6,491,390 B1 | 12/2002 | Provost |
| 6,531,180 B1 | 3/2003 | Takushima et al. |
| 6,536,045 B1 | 3/2003 | Wilson et al. |
| 6,536,589 B2 | 3/2003 | Chang |
| 6,555,235 B1 | 4/2003 | Aufderheide et al. |
| 6,559,902 B1 | 5/2003 | Kusuda et al. |
| 6,576,349 B2 | 6/2003 | Lingle et al. |
| 6,584,614 B2 | 7/2003 | Hogg |
| 6,592,950 B1 | 7/2003 | Toshima et al. |
| 6,614,423 B1 | 9/2003 | Wong et al. |
| D480,838 S | 10/2003 | Martin |
| 6,654,071 B2 | 11/2003 | Chen |
| 6,660,389 B2 | 12/2003 | Liu et al. |
| 6,662,371 B2 | 12/2003 | Shin |
| 6,667,738 B2 | 12/2003 | Murphy |
| 6,739,718 B1 | 5/2004 | Jung |
| 6,750,922 B1 | 6/2004 | Benning |
| 6,773,778 B2 | 8/2004 | Onozawa et al. |
| 6,777,055 B2 | 8/2004 | Janssen et al. |
| 6,800,378 B2 | 10/2004 | Hawa et al. |
| 6,838,610 B2 | 1/2005 | de Moraes |
| 6,841,190 B2 | 1/2005 | Liu et al. |
| 6,847,492 B2 | 1/2005 | Wilson et al. |
| 6,864,882 B2 | 3/2005 | Newton |
| 6,870,686 B2 | 3/2005 | Wilson et al. |
| 6,879,319 B2 | 4/2005 | Cok |
| 6,907,617 B2 | 6/2005 | Johnson |
| 6,911,593 B2 | 6/2005 | Mazumder et al. |
| 6,952,950 B2 | 10/2005 | Doe et al. |
| 6,967,044 B1 | 11/2005 | O'Brien |
| D512,797 S | 12/2005 | Canavan et al. |
| 6,995,976 B2 | 2/2006 | Richardson |
| 7,070,837 B2 | 7/2006 | Ross |
| 7,071,927 B2 | 7/2006 | Blanchard |
| D526,446 S | 8/2006 | Cowan et al. |
| 7,097,080 B2 | 8/2006 | Cox |
| 7,101,810 B2 | 9/2006 | Bond et al. |
| 7,103,920 B1 | 9/2006 | Otterson |
| 7,143,979 B2 | 12/2006 | Wood et al. |
| 7,184,217 B2 | 2/2007 | Wilson et al. |
| D541,991 S | 5/2007 | Lawrence |
| 7,215,473 B2 | 5/2007 | Fleming |
| 7,226,176 B1 | 6/2007 | Huang |
| 7,238,401 B1 | 7/2007 | Dietz |
| 7,311,956 B2 | 12/2007 | Pitzen |
| D559,442 S | 1/2008 | Regelbrugge et al. |
| 7,344,241 B2 | 3/2008 | Baek |
| 7,351,470 B2 | 4/2008 | Draheim et al. |
| D569,557 S | 5/2008 | Cho |
| 7,389,869 B2 | 6/2008 | Mason, Jr. |
| 7,410,684 B2 | 8/2008 | McCormick |
| 7,425,369 B2 | 9/2008 | Oakey et al. |
| D586,052 S | 2/2009 | Elias |
| 7,495,895 B2 | 2/2009 | Carnevali |
| 7,629,052 B2 | 12/2009 | Brumwell |
| 7,631,365 B1 | 12/2009 | Mahan |
| 7,663,047 B2 | 2/2010 | Hanuschak |
| 7,709,095 B2 | 5/2010 | Persoone et al. |
| 7,722,921 B2 | 5/2010 | Shimoda et al. |
| 7,727,615 B2 | 6/2010 | Kato et al. |
| 7,752,682 B2 | 7/2010 | VanDerWoude et al. |
| 7,812,077 B2 | 10/2010 | Borade et al. |
| 7,858,001 B2 | 12/2010 | Qin et al. |
| 7,937,775 B2 | 5/2011 | Manzella, Jr. et al. |
| 7,957,524 B2 | 6/2011 | Chipping |
| 8,024,818 B1 | 9/2011 | Davenport |
| 8,044,942 B1 | 10/2011 | Leonhard et al. |
| 8,261,375 B1 | 9/2012 | Reaux |
| 8,294,843 B2 | 10/2012 | Hollaway |
| 8,361,260 B2 | 1/2013 | Wilson et al. |
| D683,077 S | 5/2013 | Klotz et al. |
| 8,455,105 B2 | 6/2013 | Hobeika et al. |
| D692,187 S | 10/2013 | Isobe |
| D692,189 S | 10/2013 | Isobe |
| 8,567,596 B1 | 10/2013 | Mason, Jr. |
| 8,693,102 B2 | 4/2014 | Wilson et al. |
| 8,889,801 B2 | 11/2014 | Liao et al. |
| 8,974,620 B2 | 3/2015 | Wilson et al. |
| D726,378 S | 4/2015 | Wako |
| 8,999,509 B2 | 4/2015 | Port et al. |
| 9,023,162 B2 | 5/2015 | Mccormick et al. |
| 9,104,256 B2 | 8/2015 | Wilson et al. |
| 9,128,545 B2 | 9/2015 | Wilson et al. |
| 9,150,763 B2 | 10/2015 | Lopez et al. |
| 9,161,858 B2 | 10/2015 | Capers et al. |
| 9,170,415 B2 | 10/2015 | Mansuy |
| 9,274,625 B2 | 3/2016 | Wilson et al. |
| 9,295,297 B2 | 3/2016 | Wilson |
| D759,900 S | 6/2016 | Cummings et al. |
| 9,442,306 B1 | 9/2016 | Hines et al. |
| 9,471,163 B2 | 10/2016 | Wilson et al. |
| 9,526,290 B2 | 12/2016 | Wilson |
| 9,575,231 B2 | 2/2017 | Chu et al. |
| D781,507 S | 3/2017 | Huh |
| D781,508 S | 3/2017 | Huh |
| 9,629,407 B2 | 4/2017 | Foster |
| 9,726,940 B2 | 8/2017 | Tomiyasu |
| D805,256 S | 12/2017 | Yang |
| 9,905,297 B2 | 2/2018 | Best |
| D815,190 S | 4/2018 | Dellemann |
| 9,968,155 B2 | 5/2018 | Wilson |
| 10,070,678 B2 | 9/2018 | Wilson |
| 10,165,819 B2 | 1/2019 | Klotz et al. |
| 10,226,095 B2 | 3/2019 | Wilson |
| 10,227,501 B2 | 3/2019 | Hwang et al. |
| D849,240 S | 5/2019 | Guo et al. |
| D850,256 S | 6/2019 | Ryszawy |
| 10,321,731 B2 | 6/2019 | Wilson |
| 10,345,934 B2 | 7/2019 | Wilson et al. |
| 10,427,385 B2 | 10/2019 | Wilson et al. |
| 10,520,756 B2 | 12/2019 | Gallina et al. |
| D879,384 S | 3/2020 | Sato |
| D882,182 S | 4/2020 | Fekete |
| 10,620,670 B2 | 4/2020 | Wilson et al. |
| 10,687,569 B1 | 6/2020 | Mcdirmid |
| 10,716,986 B2 | 7/2020 | Winter et al. |
| D907,299 S | 1/2021 | Brown, II et al. |
| D907,300 S | 1/2021 | Brown, II et al. |
| D925,129 S | 7/2021 | Wilson |
| 11,141,959 B2 | 10/2021 | Wilson et al. |
| 11,147,323 B1 | 10/2021 | Wilson |
| 2001/0035936 A1 | 11/2001 | Maisnik |
| 2002/0025441 A1 | 2/2002 | Hieda et al. |
| 2002/0036362 A1 | 3/2002 | Chigira et al. |
| 2002/0101411 A1 | 8/2002 | Chang |
| 2002/0109922 A1 | 8/2002 | Wilson et al. |
| 2002/0114934 A1 | 8/2002 | Liu et al. |
| 2002/0122925 A1 | 9/2002 | Liu et al. |
| 2002/0159159 A1 | 10/2002 | Wilson et al. |
| 2002/0195910 A1 | 12/2002 | Hus et al. |

(56) References Cited

U.S. PATENT DOCUMENTS

| | | |
|---|---|---|
| 2003/0012936 A1 | 1/2003 | Draheim et al. |
| 2003/0087054 A1 | 5/2003 | Janssen et al. |
| 2003/0110613 A1 | 6/2003 | Ross |
| 2004/0004605 A1 | 1/2004 | David |
| 2004/0109096 A1 | 6/2004 | Anderson et al. |
| 2004/0121105 A1 | 6/2004 | Janssen et al. |
| 2004/0139530 A1 | 7/2004 | Yan |
| 2004/0202812 A1 | 10/2004 | Congard et al. |
| 2004/0227722 A1 | 11/2004 | Friberg et al. |
| 2004/0238690 A1 | 12/2004 | Wood et al. |
| 2004/0246386 A1 | 12/2004 | Thomas et al. |
| 2004/0258933 A1 | 12/2004 | Enniss et al. |
| 2005/0002108 A1 | 1/2005 | Wilson et al. |
| 2005/0015860 A1 | 1/2005 | Reaux |
| 2005/0133035 A1 | 6/2005 | Yahiaoui et al. |
| 2005/0186415 A1 | 8/2005 | Mccormick et al. |
| 2005/0188821 A1 | 9/2005 | Yamashita et al. |
| 2005/0200154 A1 | 9/2005 | Barbee et al. |
| 2005/0249957 A1 | 11/2005 | Jing et al. |
| 2005/0260343 A1 | 11/2005 | Han |
| 2006/0024494 A1 | 2/2006 | Amano et al. |
| 2006/0052167 A1 | 3/2006 | Boddicker et al. |
| 2006/0056030 A1 | 3/2006 | Fukuda et al. |
| 2006/0057399 A1 | 3/2006 | Persoone et al. |
| 2006/0114245 A1 | 6/2006 | Masters et al. |
| 2006/0138694 A1 | 6/2006 | Biernath |
| 2006/0158609 A1 | 7/2006 | Heil |
| 2006/0177654 A1 | 8/2006 | Shoshi |
| 2006/0204776 A1 | 9/2006 | Chen et al. |
| 2006/0254088 A1 | 11/2006 | McCormick |
| 2006/0285218 A1 | 12/2006 | Wilson et al. |
| 2007/0019300 A1 | 1/2007 | Wilson et al. |
| 2007/0181456 A1 | 8/2007 | Kusuda et al. |
| 2007/0211002 A1 | 9/2007 | Zehner et al. |
| 2007/0212508 A1 | 9/2007 | Mase |
| 2007/0229962 A1 | 10/2007 | Mason |
| 2007/0234592 A1 | 10/2007 | Crates |
| 2007/0234888 A1 | 10/2007 | Rotolo de Moraes |
| 2007/0286995 A1 | 12/2007 | Li et al. |
| 2008/0014446 A1 | 1/2008 | Donea et al. |
| 2008/0030631 A1 | 2/2008 | Gallagher |
| 2008/0055258 A1 | 3/2008 | Sauers |
| 2008/0118678 A1 | 5/2008 | Huang et al. |
| 2008/0151177 A1 | 6/2008 | Wang |
| 2008/0160321 A1 | 7/2008 | Padiyath et al. |
| 2008/0176018 A1 | 7/2008 | Enniss et al. |
| 2008/0231979 A1 | 9/2008 | Chen |
| 2008/0286500 A1 | 11/2008 | Sussner et al. |
| 2008/0292820 A1 | 11/2008 | Padiyath et al. |
| 2009/0011205 A1 | 1/2009 | Thiel |
| 2009/0026095 A1 | 1/2009 | Lofland et al. |
| 2009/0054115 A1 | 2/2009 | Horrdin et al. |
| 2009/0086415 A1 | 4/2009 | Chipping |
| 2009/0087655 A1 | 4/2009 | Yamada et al. |
| 2009/0105437 A1 | 4/2009 | Determan et al. |
| 2009/0119819 A1 | 5/2009 | Thompson |
| 2009/0181242 A1 | 7/2009 | Enniss et al. |
| 2009/0233032 A1 | 9/2009 | Craig |
| 2009/0239045 A1 | 9/2009 | Kato et al. |
| 2009/0239048 A1 | 9/2009 | Sugihara et al. |
| 2010/0026646 A1 | 2/2010 | Xiao et al. |
| 2010/0033442 A1 | 2/2010 | Kusuda et al. |
| 2010/0102197 A1 | 4/2010 | McIntyre |
| 2010/0122402 A1 | 5/2010 | Tipp |
| 2010/0146679 A1 | 6/2010 | Heil |
| 2010/0238119 A1 | 9/2010 | Dubrovsky et al. |
| 2010/0245273 A1 | 9/2010 | Hwang et al. |
| 2010/0270189 A1 | 10/2010 | Pedersen, II et al. |
| 2011/0007388 A1 | 1/2011 | Wilson et al. |
| 2011/0010994 A1 | 1/2011 | Wilson et al. |
| 2011/0012841 A1 | 1/2011 | Lin |
| 2011/0013273 A1 | 1/2011 | Wilson et al. |
| 2011/0014481 A1 | 1/2011 | Wilson et al. |
| 2011/0035936 A1 | 2/2011 | Lee |
| 2011/0052864 A1 | 3/2011 | Son |
| 2011/0097574 A1 | 4/2011 | Faldysta et al. |
| 2011/0119801 A1 | 5/2011 | Wright |
| 2011/0165361 A1 | 7/2011 | Sherman et al. |
| 2011/0168261 A1 | 7/2011 | Welser et al. |
| 2011/0267793 A1 | 11/2011 | Cohen et al. |
| 2011/0271497 A1 | 11/2011 | Suh et al. |
| 2011/0277361 A1 | 11/2011 | Nichol et al. |
| 2011/0279383 A1 | 11/2011 | Wilson et al. |
| 2012/0003431 A1 | 1/2012 | Huang |
| 2012/0030095 A1 | 2/2012 | Marshall et al. |
| 2012/0047614 A1 | 3/2012 | Choi |
| 2012/0070603 A1 | 3/2012 | Hsu |
| 2012/0081792 A1 | 4/2012 | Neuffer |
| 2012/0137414 A1 | 6/2012 | Saylor |
| 2012/0180204 A1 | 7/2012 | Hawkins |
| 2012/0183712 A1 | 7/2012 | Leonhard et al. |
| 2012/0188743 A1 | 7/2012 | Wilson et al. |
| 2012/0200816 A1 | 8/2012 | Krasnov et al. |
| 2012/0291173 A1 | 11/2012 | Gleason et al. |
| 2013/0045371 A1 | 2/2013 | O'Donnell |
| 2013/0089688 A1 | 4/2013 | Wilson et al. |
| 2013/0145525 A1 | 6/2013 | Arenson et al. |
| 2013/0247286 A1 | 9/2013 | Vanderwoude et al. |
| 2013/0293959 A1 | 11/2013 | McDonald |
| 2014/0020153 A1 | 1/2014 | Romanski et al. |
| 2014/0050909 A1 | 2/2014 | Choi et al. |
| 2014/0220283 A1 | 8/2014 | Wilson et al. |
| 2014/0259321 A1 | 9/2014 | Arnold |
| 2015/0033431 A1 | 2/2015 | Hofer Kraner et al. |
| 2015/0234209 A1 | 8/2015 | Miyamoto et al. |
| 2015/0294656 A1 | 10/2015 | Hanuschak |
| 2015/0309609 A1 | 10/2015 | Wilson et al. |
| 2015/0349147 A1 | 12/2015 | Xi et al. |
| 2015/0359675 A1 | 12/2015 | Wilson |
| 2016/0023442 A1 | 1/2016 | Faris |
| 2016/0050990 A1 | 2/2016 | Hayes |
| 2016/0073720 A1 | 3/2016 | Niedrich |
| 2016/0231834 A1 | 8/2016 | Hardi |
| 2016/0259102 A1 | 9/2016 | Taka |
| 2016/0271922 A1 | 9/2016 | Uzawa et al. |
| 2016/0318227 A1 | 11/2016 | Kim et al. |
| 2017/0079364 A1 | 3/2017 | Paulson |
| 2017/0129219 A1 | 5/2017 | Uebelacker et al. |
| 2017/0173923 A1 | 6/2017 | Davis et al. |
| 2017/0208878 A1 | 7/2017 | Kakinuma et al. |
| 2017/0232713 A1 | 8/2017 | Mannheim Astete et al. |
| 2017/0281414 A1 | 10/2017 | Wilson |
| 2017/0318877 A1 | 11/2017 | Yahiaoui et al. |
| 2018/0029337 A1 | 2/2018 | Wilson et al. |
| 2018/0042324 A1 | 2/2018 | King |
| 2018/0052334 A1 | 2/2018 | Repko |
| 2018/0094164 A1 | 4/2018 | Ito et al. |
| 2018/0148578 A1 | 5/2018 | Ohta et al. |
| 2018/0161208 A1 | 6/2018 | Huh |
| 2018/0236753 A1 | 8/2018 | Wykoff, II et al. |
| 2018/0295925 A1 | 10/2018 | Serritella et al. |
| 2018/0338550 A1 | 11/2018 | Boulware et al. |
| 2019/0021430 A1 | 1/2019 | Elliott |
| 2019/0037948 A1 | 2/2019 | Romanski et al. |
| 2019/0209912 A1 | 7/2019 | Isserow et al. |
| 2019/0212474 A1 | 7/2019 | Le Quang et al. |
| 2020/0100657 A1 | 4/2020 | Lee et al. |
| 2020/0115519 A1 | 4/2020 | Phillips et al. |
| 2020/0124768 A1 | 4/2020 | Wilson |
| 2020/0178622 A1 | 6/2020 | Jascomb et al. |
| 2020/0281301 A1 | 9/2020 | Wynalda, Jr. |
| 2021/0030095 A1 | 2/2021 | Reicher |
| 2021/0298380 A1 | 9/2021 | Brown, III et al. |
| 2021/0298390 A1 | 9/2021 | Sup, IV et al. |
| 2021/0307425 A1 | 10/2021 | Keim |

FOREIGN PATENT DOCUMENTS

| | | |
|---|---|---|
| DE | 3637188 A1 | 5/1988 |
| DE | 19808535 A1 | 9/1999 |
| DE | 202004010014 U1 | 6/2005 |
| DE | 202020101562 U1 | 5/2020 |
| DE | 202020101794 U1 | 5/2020 |
| EP | 192075 A2 | 8/1986 |

(56) References Cited

FOREIGN PATENT DOCUMENTS

| | | | |
|---|---|---|---|
| EP | 671258 | A2 | 9/1995 |
| EP | 1471415 | A2 | 10/2004 |
| EP | 3157480 | A1 | 4/2017 |
| GB | 2310862 | A | 9/1997 |
| JP | 2015128896 | A | 1/1986 |
| JP | S6117860 | A | 1/1986 |
| JP | 62053832 | A | 3/1987 |
| JP | 04314537 | A | 11/1992 |
| JP | 06143496 | A | 5/1994 |
| JP | 07021456 | A | 1/1995 |
| JP | 10167765 | A | 6/1998 |
| JP | 2002328613 | A | 11/2002 |
| JP | 2012183822 | A | 9/2012 |
| JP | 2014032222 | A | 2/2014 |
| JP | 2015128896 | A | 7/2015 |
| KR | 20120001292 | A | 1/2012 |
| TW | 200700793 | A | 1/2007 |
| TW | 201027992 | A | 7/2010 |
| WO | 0024576 | A1 | 5/2000 |
| WO | 03052678 | A1 | 6/2003 |
| WO | 2015009114 | A1 | 1/2015 |
| WO | 2015091425 | A1 | 6/2015 |
| WO | 2015093413 | A1 | 6/2015 |
| WO | 2015195814 | A1 | 12/2015 |
| WO | 2019006151 | | 1/2019 |
| WO | 2020055267 | A1 | 3/2020 |

OTHER PUBLICATIONS

MDS Nordion, "Gamma Compatible Materials," Datasheet, Aug. 2007, 4 pages, <https://ab-div-bdi-bl-blm.web.cern.ch/Radiation/Gamma_Compatible_Materials_List_companypdf>, retrieved on Sep. 29, 2021.
Li, H.-M. et al., "Influence of weight ratio in polymer blend film on the phase separation structure and its optical properties", The European Physical Journal Applied Physics, 45, 20501, published Jan. 31, 2009, EDP Sciences, 4 pages.
www.wikipedia.org. "Black Body", Jul. 2009, 11 pages.
www.wikipedia.org. "Infrared", Jul. 2009, 12 pages.
www.wikipedia.org. "PET Film (biaxially oriented)", Jul. 2009, 4 pages.
Zhang, Xin_Xiang et al., Abstract Of "One-step sol-gel preparation of PDMS-silica ORMOSILs as environment-resistant and crack-free thick antireflective coatings," Journal of Materials Chemistry, Issue 26, 2012, <http://pubs.rsc.org/en/ content/articlelanding/2012/m/c2jm31005h#!divAbstract>.
Anti-reflective coating, Wikipedia, last updated Jul. 13, 2017 by Andy Dingley, <https://en.m.wikipedia.org/wiki/Anti-reflective_coating>.
Chemical Book, "Benzophenone", https://www.chemicalbook.com/ChemicalProductProperty_EN_CB5744679.htm, available at least as of 2017, accessed online on Dec. 15, 2021 (Year: 2017).
Chemical Book, "Polymethylhydrosiloxane", https://www.chemicalbook.com/ChemicalProductProperty_EN_CB3694969.htm, available at least as of 2017, accessed online on Dec. 15, 2021 (Year: 2017).
Monotonic function, Wikipedia, accessed May 24, 2017, <https://en.wikipedia.org/wiki/Monotonic_function>.
PCT International Search Report and Written Opinion for International Application No. PCT/US2017/044438, dated Det. 23, 2017, 12 pages.
Thin Film, Wikipedia, last updated Jun. 20, 2017, <https://en.wikipedia.org/wiki/Thin_film>.
Tips to Get Quality Anti-Reflection Optical Coatings, Penn Optical Coatings, accessed May 24, 2017, <http://www.pennoc.com/tipsgetqualityantireflectionopticalcoatings/>.
Guide Chem, "UV Stabilizer", https://wap.guidechem.com/trade/uv-stabilizer-uv-absorber-ligh-id3578792.html, available at least as of 2018, accessed online on Dec. 15, 2021 (Year: 2018).
PCT International Search Report and Written Opinion for International Application No. PCT/US2020/024639, dated Jun. 11, 2020.
Pulse Racing Innovations, EZ Tear Universal Single Pull Tearoff Ramp, webpage <https://www.pulseracinginnovations.com>, Dec. 30, 2020, 6 pages.
PCT International Search Report and Written Opinion for International Application No. PCT/US2021/026165, dated Jul. 9, 2021, 10 pages.
PCT International Search Report and Written Opinion for International Application No. PCT/US21/20421, dated May 20, 2021, 8 pages.
English translation of TW201027992, "Monitor Protection Device for a Flat Panel Display", 11 pgs.
Langlet, M., "Antireflective Films", from Chapter 15 of Handbook of Sol-Gel Science and Technology Processing Characterization and Applications, copyright 2005, pp. 332-334, 337, 339-341., taken from website <https://books.google.com/books?id=i9swy1D2HxlC&lpg=PA339&dq=AR%20thick%20film%20coatings&pg=PA339#v=onepage&q=AR%20thick%20film%20coatings&f=false>.
Hostaphan RBB biaxially oriented film data sheet (Year: 2011).
PCT Search Report and Written Opinion for PCT/US2020/024639; dated Jun. 11, 2020.
PCT Search Report and Written Opinion for PCT/US2020/049919; dated Nov. 27, 2020.
Tian-Chi Chang, Xun Cao, Shan-Hu Bao, Shi=Dong Ji, Hong-Jie Luo, Ping Jin; "Review on Thermochromic Vanadium Dioxide Based Smart Coatings: From Lab to Commercial Application"; Dec. 16, 2017.
PCT Search Report and Written Opinion for PCT/US2020/062230; dated Feb. 8, 2021.
*Racing Optics, Inc.* v. *Aevoe Corp. dba Moshi*; Case 2:15-cv-01774-RCJ-VCF; "Answer to Aevoe's Counterclaims—Jury Trial Demanded"; Nov. 2, 2015; 15 pages.
Gregory Brower et al.; "Complaint for Patent Infringement"; Sep. 15, 2015; 15 pages.
Jeffrey A. Silverstri et al.; "Answer to Complaint for Patent Infringement"; Oct. 7, 2015; 34 pages.
United States Patent and Trademark Office; Office Action for U.S. Appl. No. 15/090,681; dated Aug. 26, 2016; 8 pages.
List of References considered by Examiner for U.S. Appl. No. 15/090,681; 3 pages.
List of References considered by Examiner for U.S. Appl. No. 15/090,681; 4 pages.
Examiner's search strategy and results for U.S. Appl. No. 15/090,681; dated Aug. 21, 2016; 2 pages.
*Aevoe Corp.* v. *Racing Optics, Inc.*; Case No. IPR2016-01164; Petition for Inter Partes Review of U.S. Pat. No. 9,104,256 (including Exhibits 1001-1011 and Petitioner Power of Attorney Pursuant to 37 C.F.R. 42. 10(b) for Petition tor Inter Partes Review); Jun. 21, 2016.
*Aevoe Corp.* v. *Racing Optics, Inc.*; Case No. IPR2016-01165; Petition for Inter Partes Review of U.S. Pat. No. 9,128,545(including Exhibits 1001-1006 and Petitioner Power of Attorney Pursuant to 37 C.F.R. 42. 10(b) for Petition tor Inter Partes Review); Jun. 21, 2016.
*Aevoe Corp.* v. *Racing Optics, Inc.*; Case No. IPR2016-01166; Petition for Inter Partes Review of U.S. Pat. No. 9,274,625 (including Exhibits 1001-1011 and Petitioner Power of Attorney Pursuant to 37 C.F.R. 42. 10(b) for Petition tor Inter Partes Review); Jun. 21, 2016.
Exhibit 1—Invalidity Contentions re: '545 Patent Under LPR 1-8(b)-(d); at least as early as Jul. 1, 2016.
Exhibit 2—Invalidity Contentions re: '256 Patent Under LPR 1-8(b)-(d); at least as early as Jul. 1, 2016.
Exhibit 3—Invalidity Contentions re: '620 Patent Under LPR 1-8(b)-(d); at least as early as Jul. 1, 2016.
Exhibit 4—Invalidity Contentions re: '625 Patent Under LPR 1-8(b)-(d); at least as early as Jul. 1, 2016.
Exhibit 1002—U.S. Pat. No. 5,364,671 to Gustafson; Case IPR2016-01745; Inter Partes Review of U.S. Pat. No. 8,974,620; at east as early as Sep. 7, 2016; pp. 1-6.

(56) References Cited

OTHER PUBLICATIONS

Exhibit 1004—U.S. Pat. No. 7,351,470 to Draheim et al.; Case IPR2016-01745; Inter Partes Review of U.S. Pat. No. 8,974,620 at least as early as Sep. 7, 2016; pp. 1-15.
Exhibit 1001—U.S. Pat. No. 8,974,620 to Wilson et al.; Case IPR2016-01745; Inter Partes Review of U.S. Pat. No. 8,974,620 at least as early as Sep. 7, 2016; pp. 1-15.
Exhibit 1003—U.S. Pat. No. 6,250,765 to Murakami; Case IPR2016-01745; Inter Partes Review of U.S. Pat. No. 8,974,620; at east as early as Sep. 7, 2016; p. 1-8.
Exhibit 1005—U.S. Pat. No. 7,957,524 to Chipping; Case IPR2016-01745; Inter Partes Review of U.S. Pat. No. 8,974,620; at east as early as Sep. 7, 2017; pp. 1-20.
Aevoe Corp., Racing Optics, Inc.; Petition for Inter Partes Review; Case IPR2016-01745; Inter Partes Review of U.S. Pat. No. 8,974,620; at least as early as Sep. 7, 2016; pp. 1-55.
Exhibit 1006—Japanese Application No. JP 2002-328613 to Kitaguchi Translation; IPR2016-01745; at least as early as Sep. 7, 2016; pp. 1-10.
Exhibit 1009—U.S. Appl. No. 13/838,311; Interview Summary; Case IPR2016-01745; Inter Partes Review of U.S. Pat. No. 8,974,620; at least as early as Sep. 7, 2016; p. 1-3.
Exhibit 1010—U.S. Appl. No. 15/838,311; Notice of Allowance; Case IPR2016-01745; Inter Partes Review of U.S. Pat. No. 8,974,620; at least as early as Sep. 7, 2016; pp. 1-8.
*Aevoe Corp. v. Racing Optics, Inc.*; Declaration of Darran Cairns; Case IPR2016-01745; Inter Partes Review of U.S. Pat. No. 8,974,620; at least as early as Sep. 7, 2016; pp. 1-32.
*Aevoe Corp. v. Racing Optics, Inc.*; Petitioner's Power of Attorney; Case IPR2016-01745; Inter Partes Review of U.S. Pat. No. 8,974,620; at least as early as Sep. 7, 2016; pp. 1-3.
Exhibit 1007—U.S. Appl. No. 13/838,311; Response to Office Action; Case IPR2016-01745; Inter Partes Review of U.S. Pat. No. 8,974,620; at least as early as Sep. 7, 2016; p. 1-19.
Exhibit 1008—U.S. Appl. No. 13/838,311; Response and Request for Continued Examination; Case IPR2016-01745 Inter Partes Review of U.S. Pat. No. 8,974,620; at least as early as Sep. 7, 2016; pp. 1-21.
*Aevoe Corp. v. Racing Optics, Inc.*; Mandatory Notices; Case IPR2016-01745; Inter Partes Review of U.S. Pat. No. 3,974,620; at least as early as Sep. 7, 2016; pp. 1-4.
*Aevoe Corp. v. Racing Optics, Inc.*;Power of Attorney; Case IPR2016-01745; Inter Partes Review of U.S. Pat. No. 8,974,620; at least as early as Sep. 7, 2016; pp. 1-4.
*Aevoe Corp. v. Racing Optics, Inc.*; Notice of Filing Date; Case IPR2016-01745; Inter Partes Review of U.S. Pat. No. 3,974,620; at least as early as Sep. 6, 2016; p. 1-5.
*Aevoe Corp. v. Racing Optics, Inc.*; Decision; Case IPR2016-01164; Inter Partes Review of U.S. Pat. No. 9,104,256; at east as early as Nov. 7, 2016; p. 1-24.
*Aevoe Corp. v. Racing Optics, Inc.*; Decision; Case IPR2016-01166; Inter Partes Review of U.S. Pat. No. 9,274,625; at east as early as Nov. 7, 2016; p. 1-23.
*Aevoe Corp. v. Racing Optics, Inc.*; Decision; Case IPR2016-01165; Inter Partes Review of U.S. Pat. No. 9,128,545; at east as early as Nov. 7, 2016; p. 1-25.
Settlement and License Agreement, Dec. 21, 2007, 28 pgs.
United States Patent and Trademark Office; Office Action dated Dec. 21, 2016 pertaining to U.S. Appl. No. 15/090,681, filed Apr. 5, 2016; 8 pages.
PCT Search Report and Written Opinion for US2020/016245 (dated Apr. 28, 2020).
Professional Plastics (http://www.professionalplastics.com/MelinexPETFilmDupont) 2012.
Whitney, Frank D., Preliminary Injunction, Aug. 21, 2007, 5 pgs.
Higgins, John P., Answer and Counterclaims to First Amended Complaint, Sep. 4, 2007, 27 pgs.
Ballato, John, Expert Report of John Ballato, Ph.D., Nov. 12, 2007, 5 pgs.
Russell, Geoffrey A., Rebuttal Report of Geoffrey A. Russell, Ph.D., on issues raised in the Export Report of John Ballato, Ph.D., Nov. 21, 2007, 15 pgs.
Higgins, John P., Defendants' Second Supplement to Its Response to Plaintiffs' First Set of Interrogatories, Dec. 7, 2007, 25 pgs.
Barnhardt, John J. III, Redacted Version Defendants' Memorandum in Support of Motion for Partial Summary Judgment, Dec. 3, 2007, 36 pgs.
Higgins, John P., Defendants' Second Supplement to its Response to Plaintiffs' First Set of Interrogatories, Dec. 7, 2007, 26 pgs.
Whitney, Frank D., Consent Judgment Order, Jan. 3, 2008, 5 pgs.
Ballato, John, Supplemental Expert Report of John Ballato, Ph.D., Nov. 19, 2007, 10 pgs.
Moore, Steven D., Plaintiffs' Motion to Strike Defendants' New and Untimely Invalidity Theory, Dec. 19, 2007, 3 pgs.
Moore, Steven D., Plaintiffs' Brief in Support of Motion to Strike Defendants' New and Untimely Invalidity Theory, Dec. 19, 2007, 10 pgs.
Barnhardt, John J. III, Notice Pursuant to 35 U.S.C. 282, Dec. 18, 2007, 3 pgs.
Office Action for Canadian Patent Application No. 2,952,436; dated Jul. 8, 2020.
Prosecution History of U.S. Re-Examination Application No. 95/002,073 titled Touch Screen Protector; pp. 1-1,980.
www.store.moshimode.com; "iVisor AG for iPad 2 Black"; 2004-2010.
Defendant's Motion for Summary Judgment; Oct. 25, 2013; pp. 1-31.
Jake Gaecke; "Appletell Reviews the iVisor for iPad"; www.appletell.com; Sep. 15, 2010 at 12:32 p.m. www.technologytell.com/apple/60407/appletell-reviews-ag-for-ipad/; 2 pages.
www.nushield.com/technology.php; "What Makes NuShield Screen Protectors Superior", 2 pages.
www.spigen.com; "Something You Want"; 2 pages.
www.zagg.com; "Apple iPad 2 (Wi-Fi 3G) Screen Protector"; 2 pages.
www.gadgetguard.com; "Invisible Gadget Guard, the Original"; 1 page.
www.incipotech.com; "Protect Your iPhone 4 with Screen Protectors from Incipo"; 3 pages.
www.store.moshimonde.com; "iVisor AG iPad Screen Protector"; Jul. 2010; 7 pages.
www.store.moshimonde.com; "iVisor XT Crystal Clear Protector for iPad"; Aug. 2010; 3 pages.
www.store.moshimonde.com; "iVisor AG for iPad 2 Black"; Mar. 2011; 5 pages.
www.store.moshimonde.com; "iVisor AG for iPad 2 White"; Mar. 2011; 3 pages.
www.store.moshimonde.com; "iVisor AG for iPhone 4/4S Black"; Nov. 2010; 5 pages.
www.store.moshimonde.com; "iVisor AG for iPhone 4/4S White"; May 2010; 4 pages.
Dictionary.com (http://dictionary.reference.com) 2012.
*Racing Optics, Inc. v. Aevoe, Inc., d/b/a/ MOSHI*; Case No. 15-cv-017744-JCM-VCF; Aevoe's Initial Disclosure Non-Infringement, Invalidity and Unenforceability Contentions (Redacted) dated Jan. 7, 2016.
Defendant Aevoe Corp.'s Non-Infringement Contentions and Responses to Racing Optic's Disclosure of Asserted Claims and Infringement Contentions (U.S. Pat. No. 9,128,545) dated Jan. 7, 2016.
Defendant Aevoe Corp.'s Non-Infringement Contentions and Responses to Racing Optic's Disclosure of Asserted Claims and Infringement Contentions (U.S. Pat. No. 9,104,256) dated Jan. 7, 2016.
Defendant Aevoe Corp.'s Non-Infringement Contentions and Responses to Racing Optic's Disclosure of Asserted Claims and Infringement Contentions (U.S. Pat. No. 8,974,620) dated Jan. 7, 2016.
*I-Blason Llc v. Aevoe, Inc. and Aevoe Corp.*; Case IPR2016-TBA; Petition for Inter Partes Review of U.S. Pat. No. 8,044,942 (including Exhibits 1001-1019).
Dupont Teijin Films, "Mylar Polyester Film—Optical Properties", Jun. 2003, 2 pages.
https://en.wikipedia.org/wiki/Black_body, "Black Body", Jul. 2009, 11 pages.

(56) References Cited

OTHER PUBLICATIONS https://en.wikipedia.org/wiki/Infrared, "Infrared", Jul. 2009, 12 pages.
https://en.wikipedia.org/wiki/BoPET, "PET Film (biaxially oriented)", Jul. 2009, 4 pages.
Instashield LLC, Bionic Wrench® Inventor Creates Low-Cost Face Shield For Masses, Apr. 15, 2020, 3 pages.
Tom Zillich, Surrey manufacturer hopes to hit home run with face shield that clips to baseball cap, Apr. 29, 2020, 3 pages.
Opentip, Opromo Safety Face Shield Visor for Adult Kids,Protective Cotton Hat with Removable PVC Face Cover <https://www.opentip.com/product.php?products_id=11699030>, May 5, 2020, 3 pages.
Hefute, Hefute 5 Pcs Protective Face Cover with Shield Comfortable Full Protection Face Compatiable with Glasses Anti-Droplet Anti-Pollution and Windproof Transparent Safety Face Cover with Shield(Style B) <https://www.amazon.com/dp/B086GSG8DH/ref-sspa_dk_detail_9?psc=1&pd_rd_i=B086GSG8DH&pd_rd_w=Ocdm2&pf_rd_p=48d372c1-f7e1-4b8b-9d02-4bd86f5158c5&pd_rd_wg=qkB2b&pf_rd_r=M%E2%80%A6>, May 6, 2020, 7 pages.
Geanbaye, Geanbaye Safety Full Face Shield Cap Detachable Baseball Cap Anti-Saliva Anti-Spitting Eye Protective Hat Windproof Dustproof <https://www.amazon.com/dp/B086DV32B8/ref=sspa_dk_detail_8?psc=1&pd_rd_i=B086DV32B8&pd_rd_w=MwjfT&pf_rd_p=48d372c1-f7e1-4b8b-9d02-4bd86f5158c5&pd_rd_wg=pxuOs&pf_rd_r=PNDA%E2%80%A6>, May 5, 2020, 8 pages.
Leigh Buchanan, These 2 Companies Are Making Face Shields for Everyone <https://www.inc.com/leigh-buchanan/face-shields-coronavirus-protection-open-source.html>, May 6, 2020, 8 pages.
Brim Shield, photographs, Apr. 21, 2020, 1 pages.
Hatshield, Shield Yourself With The Hatshield <https://www.hatshield.com/?gclid=CjwKCAjwp-X0BRAFEiwAheRui1u89v_3URuiwEVvBRGa9TaEfWoZVMJXRkWsZgPTUw-0fHJ5HD-8uhoCc84QAvD_BwE>, Apr. 17, 2020, 11 pages.
Eli N. Perencevich, Moving Personal Protective Equipment Into the Community Face Shields and Containment of COVID-19, Apr. 29, 2020, 2 pages.
Chang, Tian-Ci; Cao, Xun; Bao, Shan-Hu; Ji, Shi-Dong; Luo, Hong-Jie; Jin, Ping; Review of Thermochromic Vanadium Dioxide Based Smart Coatings: From Lab to Commercial Application; Dec. 16, 2017.
Saudi Basic Industries Corporation (SABIC); "The Department of Transportation [DOT] Guidebook"; Oct. 2016.
Hostaphan RBB, "Transparent, Temperature Stable Polyester Film for Cooking & Roasting Bags" Jul. 2016.
Hostaphan Win, "White, Long-Term Stable, Thermally Stable Polyester Film for PV Back Sheet Laminates"; Jul. 2016.
PCT Search Report & Written Opinion for PCT/US2019/054565 (dated Dec. 20, 2019).
PCT Search Report & Written Opinion for PCT/US2015/036248 (dated Sep. 16, 2015).
"Declaration of Jerome Aho"; Filed Aug. 3, 2007; Case 3:07-cv-00221-FDW-DCK; Includes: Exhibit A, Nascar Postcard (1 page), Exhibit B, 50th Anniversary Nascar letter sent Jan. 7, 1998 (1 page), and Exhibit C, Front page of "The Official Nascar Preview and Press Guide" (1 page); 9 pages.
*Racing Optics, Inc.* v. *David Leon O'Neal, Edward M. Wallace and Clear View Racing Optics, LLC*; Case 3:07 CV 221 Includes: Exhibit A, Wilson et al. U.S. Pat. No. 6,847,492; and Exhibit B, Wilson et al. U.S. Pat. No. 7,184,217; 34 pages.
International Search Report; International Application No. PCT/US99/95128; Date of Completion: Jan. 18, 2000; 54 pages.
International Search Report; International Application No. PCT/US02/10971; Date of Completion: Nov. 20, 2002 3 pages.
International Search Report; International Application No. PCT/US03/16284; Date of Completion: Mar. 9, 2004; 3 pages.
European Search Report for Application No. 15809930.9-107/3157480 (dated Dec. 15, 2017).
Canadian Office Action for Application Serial No. 2,952,436 (dated Nov. 15, 2019).
Canadian Office Action for Application Serial No. 2,952,436 (dated May 3, 2019).
Australian Examination Report for Application Serial No. 2015277196 (dated Oct. 18, 2018).
www.wikipedia.org, Refractive Index, Oct. 31, 2014.

METHOD AND APPARATUS FOR REDUCING NON-NORMAL INCIDENCE DISTORTION IN GLAZING FILMS

CROSS-REFERENCE TO RELATED APPLICATIONS

This application claims the benefit of U.S. Provisional Application No. 62/942,943 filed Dec. 3, 2019, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to transparent coverings for windows, eyewear, or display screens and, more particularly, transparent coverings for use in non-normal incidence applications such as vehicle windshields.

2. Related Art

In various contexts, it is advantageous to affix transparent coverings to a substrate. Windows of buildings or vehicles may be covered with transparent window films for tinting (e.g. for privacy), for thermal insulation, to block ultraviolet (UV) radiation, or for decoration. Protective eyewear (e.g. goggles, glasses, and facemasks for off-road vehicle use, medical procedures, etc.) may be covered with a stack of transparent lenses for easy tear-away as the eyewear becomes dirty and obstructs the wearer's vision. Display screens of mobile phones, personal computers, ATMs and vending terminals, etc. may be covered with protective lenses to prevent damage to the underlying screen or block side viewing (e.g. for privacy and security in public places). While the majority of such applications transmit light to an observer at normal incidence, non-normal incidence applications exist as well. In the case of automobile windshields, for example, there has been a trend to increase the angle of incidence to 60-70 degrees from normal or even higher in an effort to reduce drag and improve fuel efficiency.

BRIEF SUMMARY

The co-inventors have discovered an increase in optical distortion when transparent coverings (e.g. glazing films) are applied at high angles of incidence (e.g. greater than 60 degrees from normal) as in the case of transparent coverings applied to vehicle windshields. The present disclosure contemplates various apparatuses and methods for manufacturing polymer films that overcome this difficulty, as well as polymer films made in accordance therewith. One aspect of the embodiments of the disclosure is a method of manufacturing a polymer film. The method may include melting a resin, extruding the melted resin through a die to produce a polymer film, shaping the polymer film, cooling the polymer film, capturing an image of a test pattern through the polymer film, calculating a modulation transfer function value from the image, and adjusting a process parameter of the melting, the extruding, the shaping, or the cooling based on the calculated modulation transfer function value.

The process parameter may be a temperature setting of a heater used in the melting.

The process parameter may be a rotation speed of an extrusion screw used in the extruding.

The process parameter may be a rotation speed of a roller used in the shaping or the cooling.

The method may include capturing an additional image of the test pattern through the polymer film with the polymer film at a different angle relative to the test pattern and calculating an additional modulation transfer function value from the additional image. The adjusting may be based on the calculated additional modulation transfer function value. During the capturing of the image, the polymer film may be at an angle relative to the test pattern of 55-65 degrees. During the capturing of the additional image of the test pattern through the polymer film, the polymer film may be at an angle relative to the test pattern of 65-75 degrees.

The capturing of the image may be performed by an imaging radiometer 10-30 meters from the test pattern. The capturing of the image may be performed with the test pattern 1-10 meters from the polymer film.

The test pattern may comprise line pairs.

The method may include capturing a baseline image of the test pattern that is not taken through the polymer film and calculating a baseline modulation transfer function value from the baseline image. The adjusting may be based on a difference between the calculated modulation transfer function value and the calculated baseline modulation transfer function value. During the capturing of the image, the polymer film may be at an angle relative to the test pattern of 55-65 degrees. The adjusting may be performed such that the difference between the calculated modulation transfer function value and the calculated baseline modulation transfer function value is kept below 0.12. The method may include capturing an additional image of the test pattern through the polymer film with the polymer film at an angle relative to the test pattern of 65-75 degrees and calculating an additional modulation transfer function value from the additional image. The adjusting may be performed such that the difference between the calculated additional modulation transfer function and the calculated baseline modulation transfer function is kept below 0.38. During the capturing of the image, the polymer film may be at an angle relative to the test pattern of 60 degrees. During the capturing of the additional image, the polymer film may be at an angle relative to the test pattern of 70 degrees.

The polymer film may be a biaxially-oriented polyethylene terephthalate film.

The process parameter may affect a density variation of the polymer film.

The process parameter may affect a refractive index variation in the polymer film. The process parameter may affect a frequency of refractive index changes on the order of 0.010 in the polymer film.

Another aspect of the embodiments of the disclosure is a polymer film. The polymer film may have a density variation such that a difference between i) a first modulation transfer function value calculated from an image of a test pattern captured through the polymer film with the polymer film at an angle of 60 degrees relative to the test pattern and ii) a baseline modulation transfer function calculated from an image of the test pattern that is not taken through the polymer film is less than 0.12. The density variation may be such that a difference between i) a second modulation transfer function value calculated from an image of a test pattern captured through the polymer film with the polymer film at an angle of 70 degrees relative to the test pattern and ii) the baseline modulation transfer function is less than 0.38.

Another aspect of the embodiments of the disclosure is an apparatus for manufacturing a polymer film. The apparatus may include an extruder assembly for melting a resin and extruding the melted resin through a die to produce a polymer film, a roller for shaping and/or cooling the polymer film, an image sensor for capturing an image of a test pattern through the polymer film, and a computer for calculating a modulation transfer function value from the image and adjusting a process parameter of the extruder assembly or the roller based on the calculated modulation transfer function value.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various polymer films and polymer film manufacturing apparatuses and methods. The detailed description set forth below in connection with the appended drawings is intended as a description of several currently contemplated embodiments. It is not intended to represent the only form in which the disclosed subject matter may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
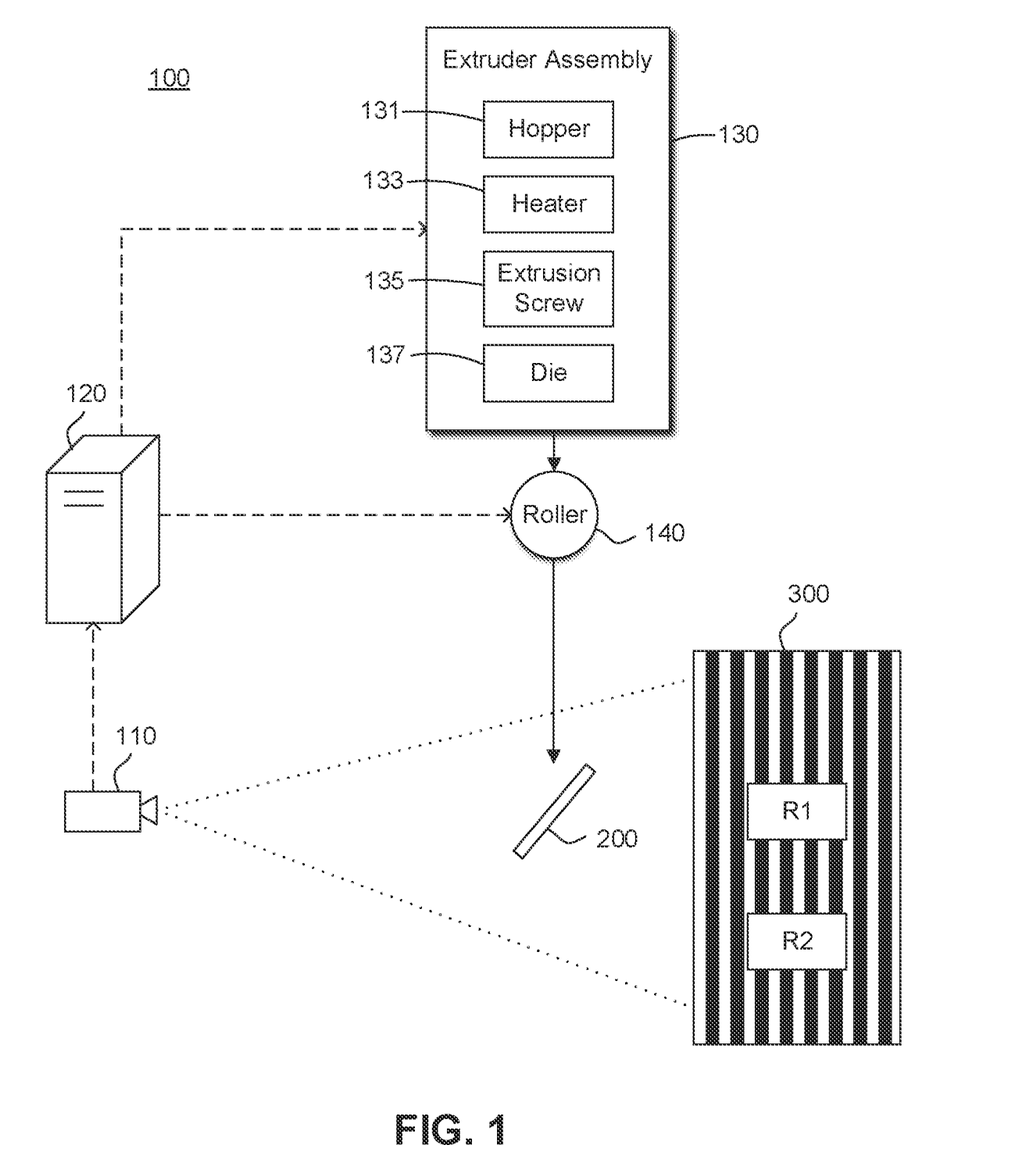
FIG. 1 shows an example apparatus for manufacturing a polymer film according to an embodiment of the present disclosure.

FIG. 1 shows an example apparatus 100 for manufacturing a polymer film 200 such as a biaxially oriented polyethelene terephthalate (BoPET) film according to an embodiment of the present disclosure. During or after the manufacture of the polymer film 200, an image sensor 110, such as an imaging radiometer or camera, captures an image of a test pattern 300 through the polymer film 200. A computer 120 calculates a modulation transfer function (MTF) value from the captured image and feeds the result back into the manufacturing process of the polymer film 200. In this way, the apparatus 100 may adjust one or more process parameters that have been found by the inventor to influence optical distortion in the manufactured polymer film 200.

Figure 2:
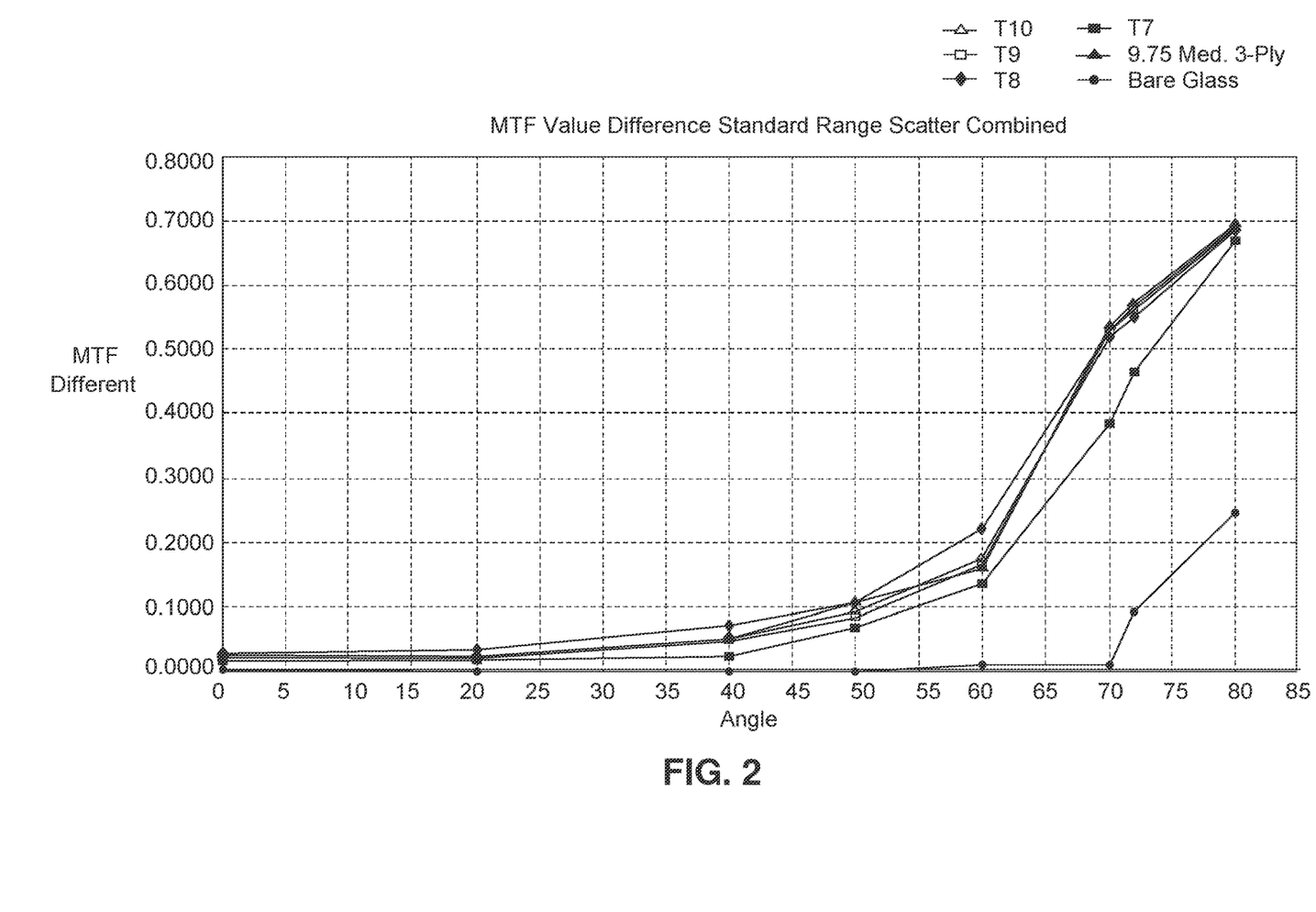
FIG. 2 shows an example graphical representation of modulation transfer function (MTF) data for various brands of biaxially-oriented polyethelene terephthalate (BoPET) at various angles of incidence.
Figure 3:
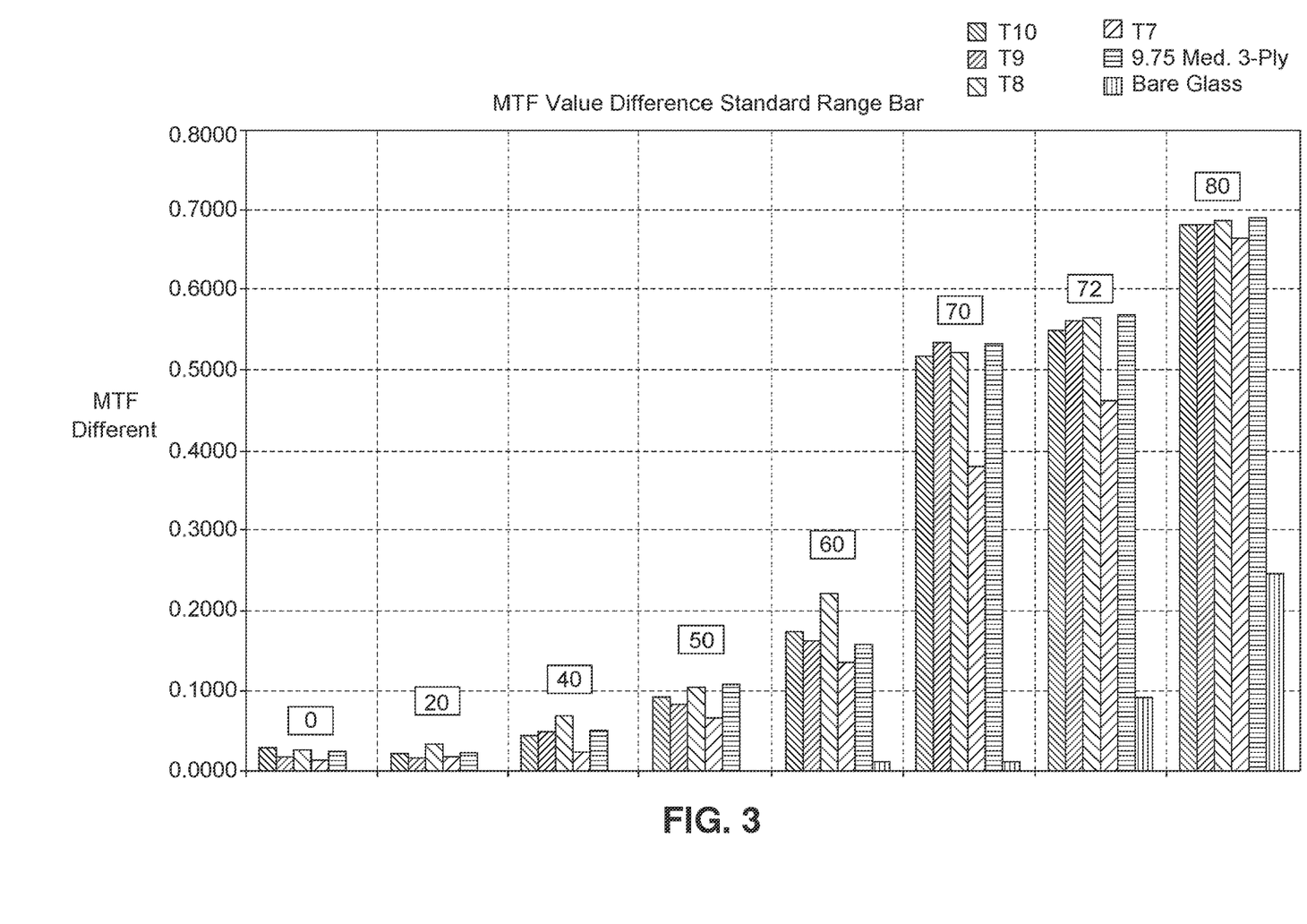
FIG. 3 shows another example graphical representation of MTF data for various brands of BoPET at various angles of incidence.

FIGS. 2 and 3 show example graphical representations of MTF data for various brands of BoPET films at various angles of incidence. The data, shown as a line graph in FIG. 2 and a bar graph in FIG. 3, represents the difference in measured MTF values (ranging from 0.0000 to 0.8000 on the y-axis) between an image of a test pattern 300 viewed through a transparent sample and an image of the test pattern 300 directly, as a function of angle of incidence (ranging from 0 to 80 degrees from normal) for four BoPET film samples T10, T9, T8, and T7, as well as for a 9.75 Med. 3-Ply (i.e., medical grade) BoPET film sample and a bare glass sample. As can be seen, for all of the polymer film samples, the distortion represented by the MTF difference gradually increases with angle of incidence until around 60 degrees, at which point the data exhibits a "knee" indicative of a sudden increase in distortion as the MTF of the films starts to collapse. This sudden worsening of the MTF of polymer films at around 60 degrees, which is not present in bare glass, is believed to be due to the occurrence of random small changes in refractive index on the order of 0.010 caused by density variations across the polymer film as it is extruded and cooled during manufacturing. By feeding MTF data back into the manufacturing process, it is thus possible to tune the relevant process parameters to produce a polymer film having improved distortion characteristics at off-normal incidence.

Referring back to FIG. 1, an example extruder assembly 130 of the apparatus 100 may include a hopper 131 for loading polymer resin (e.g. pellets, beads, etc.), a heater 133 for providing heat to the extruder assembly 130 to melt the resin, an extrusion screw 135 for moving the resin forward through one or more heated regions of the extruder assembly 130 (e.g. by rotating within a barrel), and a die 137 having a desired shape through which the melted resin is forced to produce the resulting polymer film 200. The polymer film 200 may thereafter be cooled and/or further shaped by one or more downstream rollers 140, eventually bringing the polymer film 200 to its final thickness and shape.

As noted above, it is believed that density variations across the polymer film as it is extruded and cooled cause changes in the index of refraction that result in the increased distortion found at higher angles of incidence. Therefore, it is contemplated that the apparatus 100 may be configured to adjust one or more process parameters that affect the density variation of the polymer film 200 and/or the refractive index variation in the polymer film 200. Relevant process parameters may include, for example, a temperature setting of the heater 133 used in melting the resin (e.g. absolute temperature or relative temperatures of a gradient or profile of a plurality of heated regions of the extruder assembly 130), a rotation speed of the extrusion screw 135 (which may determine melting time as well as degree of mixing of the resin), and/or a rotation speed of the one or more rollers 140 (which may determine cooling time and/or a degree of force acting on the polymer film 200 during or prior to cooling to stretch or otherwise shape the polymer film 200 in longitudinal and/or transverse directions while the polymer film 200 is still pliable). The computer 120 may be programmed to adjust one or more such process parameters or any other relevant process parameters of the melting, extruding, shaping, or cooling based on a calculated MTF value associated with the manufactured polymer film 200. In this way, the distortion of the polymer film 200 may be optimized for the intended angle of incidence at which the polymer film 200 will be used.

The MTF value calculated by the computer 120 may be, for example, a single value of a modulation transfer function corresponding to a specific spatial frequency (e.g. a contrast percentage when resolving a specific number of line pairs per millimeter), an average value of a modulation transfer function over a range of spatial frequencies, or any other value representative of or derived from a modulation transfer function. In the example of the apparatus 100 shown in FIG. 1, a test pattern 300 comprising line pairs defining one or more spatial frequencies (e.g. 5 LP/mm) is set up behind the polymer film 200, and an image sensor 110 (e.g. a 40-megapixel imaging radiometer) is positioned to capture an image of the test pattern 300 through the polymer film 200. The test pattern may be 1-10 meters (e.g. 5 meters) from the polymer film 200, and the image sensor 110 may be 10-30 meters (e.g. 15 meters) from the polymer film 200. The test pattern 300 may be produced by an LCD pattern generator, for example, in which case the one or more spatial frequencies may be sequentially generated. Alternatively, the test pattern 300 may be printed on a substrate and may include one or more spatial frequencies located in different regions of the substrate.

The MTF value calculated from the image captured through the polymer film 200 may be compared to a baseline MTF value calculated from a direct image of the test pattern 300 without the polymer film 200. For example, the baseline MTF value may be subtracted from the MTF value associated with the polymer film 200 such that a difference value of "0" represents no distortion caused by the polymer film 200 and a difference value of "1" represents total distortion (i.e. no resolution). In this way, a difference in measured MTF values between an image of the test pattern 300 viewed through the polymer film 200 and an image of the test pattern 300 directly may be obtained, such as difference data of the type shown in FIGS. 2 and 3. To this end, as shown in the example of FIG. 1, the test pattern 300 may be positioned relative to the polymer film 200 and the image sensor 110 such that the field of view of the image sensor 110 encompasses both a region R1 of the test pattern 300 that is behind the polymer film 200 and a region R2 of the test pattern 300 that is not behind the polymer film 200. With such arrangement, the image sensor 110 may capture a baseline image of the test pattern 300 that is not taken through the polymer film 200 but is otherwise taken under the same conditions as the image captured through the polymer film 200. Alternatively, the baseline image of the test pattern 300 may be captured at a different time under substantially the same conditions.

In order to obtain MTF values for different angles of the polymer film 200, multiple images may be taken with the polymer film 200 rotated relative to the image sensor 110 and/or test pattern 300. For example, during the capturing of a first image of the test pattern 300 through the polymer film 200, the polymer film may be at an angle relative of the test pattern 300 of 55-65 degrees (e.g. 60 degrees) and, during capturing of an additional image of the test pattern 300 through the polymer film 200, the polymer film 200 may be at an angle relative to the test pattern 300 of 65-75 degrees (e.g. 70 degrees). The computer 120 may then adjust the manufacturing process parameter(s) based on both the MTF value calculated form the first image and an additional MTF value calculated from the additional image, both relative to a baseline MTF value as described above. It is contemplated that a sufficiently distortion-free film for use at off-normal incidence (e.g. for vehicle windshields) may have an MTF value difference (relative to baseline) of below 0.12 at 60 degrees and an MTF value difference (relative to baseline) of below 0.38 at 70 degrees.

It is contemplated that the computer 120 may be programmed to adjust the process parameter(s) automatically without user input or in response to commands entered into a user interface of the computer 120. In this regard, the apparatus 100 may be set up to allow the image sensor 110 to capture images of the test pattern 300 through the polymer film 200 in a continuous process. For example, the various images described above may be captured during or after cooling while the polymer film 200 is on the roller(s) 140. In the case of multiple images at different angles of incidence, multiple image sensors 110 and/or test patterns 300 may be set up at different stages or a single image sensor 110 and/or test pattern 300 may automatically move to multiple positions. As the computer 120 calculates MTF values from the captured images, the computer 120 may continuously adjust the relevant process parameters in order to keep the desired MTF value(s) (or difference(s) from baseline thereof) below specified values. Alternatively, the apparatus 100 may be set up to capture images and make adjustments to process parameters in a batch to batch process, either automatically or by manual operation. For example, after a polymer film 200 batch is completed (or during cooling), the relevant MTF values may be calculated and the computer 120 may make adjustments to the process parameters to improve the distortion characteristics of the next batch or to optimize the distortion characteristics of the next batch for a different purpose (e.g. to minimize distortion at a different range of angles of incidence).

Figure 4:
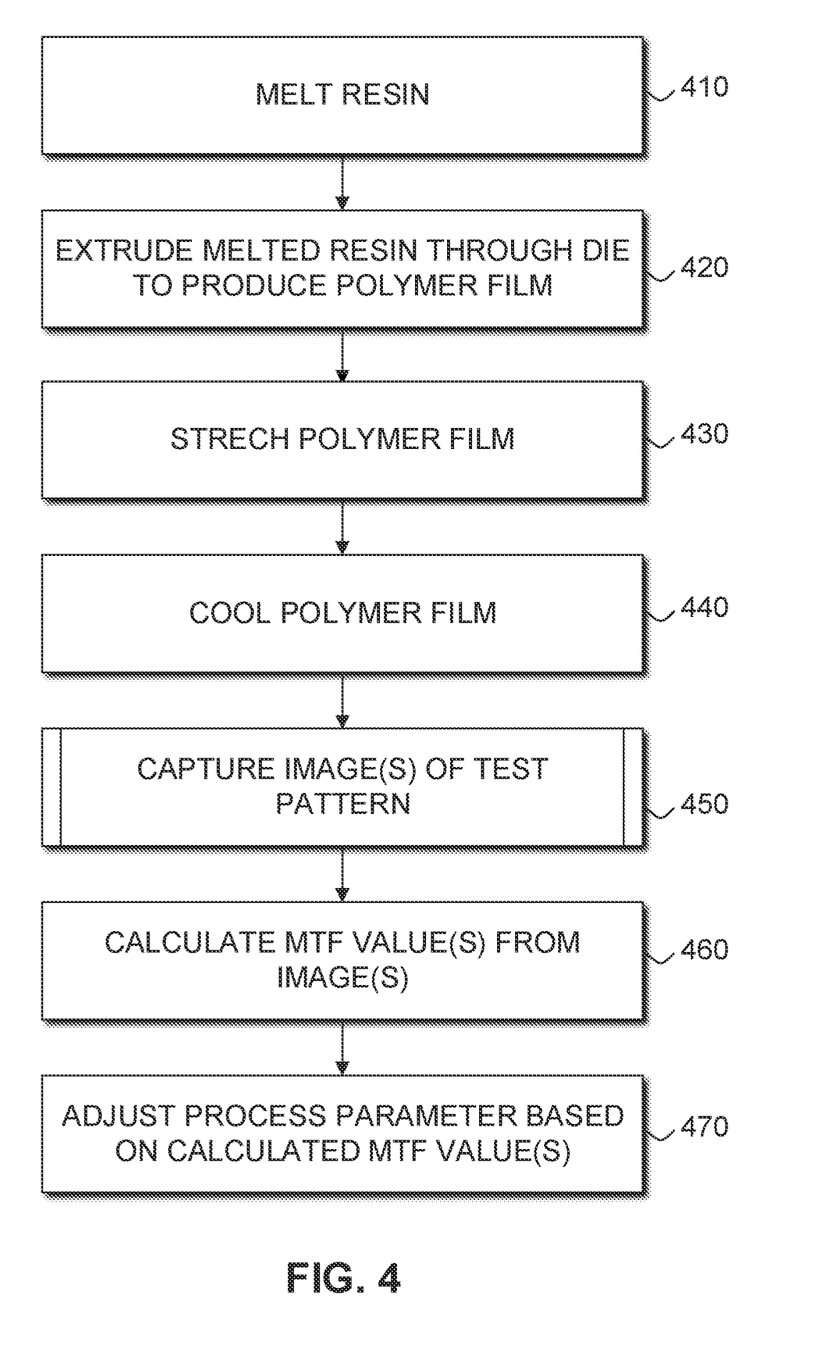
FIG. 4 shows an example operational flow according to an embodiment of the present disclosure.
Figure 5:
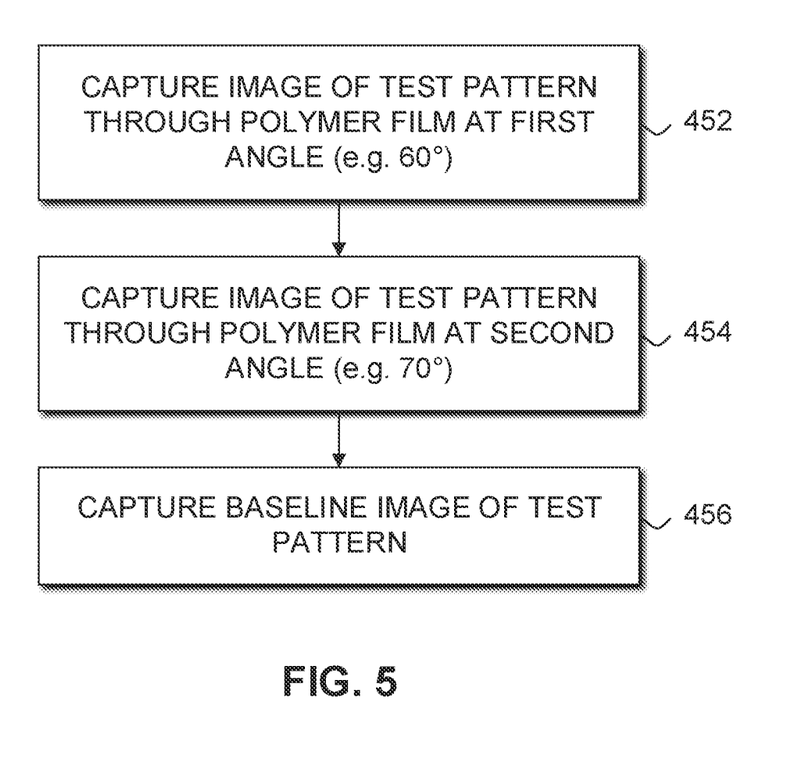
FIG. 5 shows an example operational flow of step 440 of FIG. 4.

FIGS. 4 and 5 show an example operational flow according to an embodiment of the present disclosure, with FIG. 5 detailing an example subprocess of step 440 of FIG. 4. Referring by way of example to the apparatus 100 shown in FIG. 1, the operational flow may begin with a step 410 of melting a resin, a step 420 of extruding the melted resin through a die to produce a polymer film 200, and steps 430 and 440 of shaping (e.g. stretching) and cooling the polymer film 200. For example, steps 410, 420, 430, and 440 may be performed by an extruder assembly 130 and downstream roller(s) 140 as described in relation to FIG. 1. During or subsequent to these steps, the operational flow may include a step 450 of capturing one or more images of a test pattern 300 (e.g. using an image sensor 110). As shown in FIG. 5, the capturing of one or more images of the test pattern 300 may include a step 452 of capturing a first image of the test pattern 300 through the polymer film 200 at a first angle (e.g. around 60 degrees from normal), a step 454 of capturing an additional image of the test pattern 300 through the polymer film 200 at a second angle (e.g. around 70 degrees from normal), and a step 456 of capturing a baseline image of the test pattern 300 that is not taken through the polymer film 200. For example, the baseline image may be taken by the image sensor 110 of a region R2 of the test pattern 300 that is not behind the polymer film 200. In some cases, the baseline image 110 may be taken at a different time altogether.

Referring back to FIG. 4, following the capturing of one or more images of the test pattern 300 during or after steps 410, 420, 430, and 440, the operational flow may continue with a step 460 of calculating one or more MTF values from the captured image(s) and a step 470 of adjusting process parameter(s) based on the calculated MTF value(s). In this way, the results of calculating the one or more MTF values associated with the polymer film 200 may be fed back into the manufacturing process to tune the optical distortion properties of the polymer film 200 being produced. The calculation of MTF value(s) and/or adjusting of process parameter(s) may be performed by an appropriately programmed computer 120 as described above. In this regard, the computer 120 may include a processor or programmable circuit (e.g. FPGA, PLA, etc.) for executing program instructions (e.g. software instructions, state information, etc.). The calculating step 460 and/or adjusting step 470 may be embodied in such program instructions and stored on a non-transitory program storage medium to be executed by the computer 120.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of manufacturing a polymer film, the method comprising:
   melting a resin;
   extruding the melted resin through a die to produce a polymer film;
   shaping the polymer film;
   cooling the polymer film;
   capturing an image of a test pattern through the polymer film;
   calculating a modulation transfer function value from the image; and
   adjusting a process parameter of the melting, the extruding, the shaping, or the cooling based on the calculated modulation transfer function value.

2. The method of claim 1, wherein the process parameter is a temperature setting of a heater used in the melting.

3. The method of claim 1, wherein the process parameter is a rotation speed of an extrusion screw used in the extruding.

4. The method of claim 1, wherein the process parameter is a rotation speed of a roller used in the shaping or the cooling.

5. The method of claim 1, further comprising:
   capturing an additional image of the test pattern through the polymer film with the polymer film at a different angle relative to the test pattern; and
   calculating an additional modulation transfer function value from the additional image,
   wherein the adjusting is based on the calculated additional modulation transfer function value.

6. The method of claim 5, wherein, during the capturing of the image, the polymer film is at an angle relative to the test pattern of 55-65 degrees and, during the capturing of the additional image of the test pattern through the polymer film, the polymer film is at an angle relative to the test pattern of 65-75 degrees.

7. The method of claim 1, wherein the capturing of the image is performed by an imaging radiometer 10-30 meters from the test pattern.

8. The method of claim 7, wherein the capturing of the image is performed with the test pattern 1-10 meters from the polymer film.

9. The method of claim 1, wherein the test pattern comprises line pairs.

10. The method of claim 1, further comprising:
    capturing a baseline image of the test pattern that is not taken through the polymer film; and
    calculating a baseline modulation transfer function value from the baseline image,
    wherein the adjusting is based on a difference between the calculated modulation transfer function value and the calculated baseline modulation transfer function value.

11. The method of claim 10, wherein, during the capturing of the image, the polymer film is at an angle relative to the test pattern of 55-65 degrees.

12. The method of claim 11, wherein said adjusting is performed such that the difference between the calculated modulation transfer function value and the calculated baseline modulation transfer function value is kept below 0.12.

13. The method of claim 12, further comprising:
    capturing an additional image of the test pattern through the polymer film with the polymer film at an angle relative to the test pattern of 65-75 degrees;
    calculating an additional modulation transfer function value from the additional image,
    wherein said adjusting is performed such that the difference between the calculated additional modulation transfer function and the calculated baseline modulation transfer function is kept below 0.38.

14. The method of claim 13, wherein, during the capturing of the image, the polymer film is at an angle relative to the test pattern of 60 degrees and, during the capturing of the additional image, the polymer film is at an angle relative to the test pattern of 70 degrees.

15. The method of claim 1, wherein the polymer film is a biaxially-oriented polyethylene terephthalate film.

16. The method of claim 1, wherein the process parameter affects a density variation of the polymer film.

17. The method of claim 1, wherein the process parameter affects a refractive index variation in the polymer film.

18. The method of claim 17, wherein the process parameter affects a frequency of refractive index changes on the order of 0.010 in the polymer film.

* * * * *